United States Patent
Wilson et al.

(10) Patent No.: US 6,966,471 B1
(45) Date of Patent: Nov. 22, 2005

(54) FOLDING LUGGAGE RACK FOR MOTORCYCLES

(76) Inventors: Robert L. Wilson, P.O. Box 610, Camp Verde, AZ (US) 86322; Betty Wilson, P.O. Box 610, Camp Verde, AZ (US) 86322

(*) Notice: Subject to any disclaimer, the term of this patent is extended or adjusted under 35 U.S.C. 154(b) by 0 days.

(21) Appl. No.: 10/621,653

(22) Filed: Jul. 16, 2003

Related U.S. Application Data (60) Provisional application No. 60/397,151, filed on Jul. 19, 2002.

(51) Int. Cl.⁷ .................................. B62J 7/04

(52) U.S. Cl. ............... 224/413; 224/423; 224/443; 224/444; 224/447; 224/448; 224/450; 224/453; 224/499; 224/509; 224/549; 224/553

(58) Field of Search ................. 224/413, 423, 224/425, 426, 443, 444, 447, 448, 450, 452, 224/453, 457, 497, 499, 509, 549, 553; 280/762, 280/769; 297/352–354, 363, 365, 373–377

(56) References Cited

U.S. PATENT DOCUMENTS

| | | | | |
|---|---|---|---|---|
| 3,698,762 A | * | 10/1972 | Gorman | 297/377 |
| 3,822,917 A | * | 7/1974 | George | 297/215.12 |
| 3,901,534 A | | 8/1975 | Popken | |
| 4,349,138 A | * | 9/1982 | Bruhn | 224/443 |
| 4,570,998 A | * | 2/1986 | Hughes | 297/353 |
| 5,931,360 A | * | 8/1999 | Reichert | 224/413 |
| 6,484,914 B1 | * | 11/2002 | Willey | 224/413 |
| 6,568,699 B2 | * | 5/2003 | McCann | 224/412 |
| 6,659,547 B2 | * | 12/2003 | Petersen | 297/353 |

* cited by examiner

*Primary Examiner*—Gary E. Elkins
(74) *Attorney, Agent, or Firm*—Gregory J. Nelson (57) ABSTRACT

A luggage rack for a motorcycle having a shape conforming to the existing backrest on a sissy bar. The luggage rack is mounted to the existing mounting plate at brackets which may be selectively adjusted to provide the desired friction fit. The rack can be pivoted between an upright, stored position and a horizontal use position. In the stored position a stop associated with the brackets engage a portion of the rack to maintain it in a horizontal position. In one embodiment, a magnet on the rack exerts a force to retain the rack in an upright position against the sissy bar.

6 Claims, 7 Drawing Sheets

FOLDING LUGGAGE RACK FOR MOTORCYCLES

CROSS REFERENCE TO RELATED APPLICATION

This application is abased on provisional application Ser. No. 60/397,151, filed Jul. 19, 2002, of the same title.

FIELD OF THE INVENTION

The present invention relates to a luggage rack and more particularly relates to a fold-down luggage rack for motorcycles.

BACKGROUND OF THE INVENTION

Transporting items such as luggage on a motorcycle presents problems because of space limitations. In the past, many motorcycle riders relied on use of saddlebags which straddled the rear fender and provided storage compartments in which luggage and gear may be stowed. More recently, some motorcycles are provided with various types of luggage racks, either as an OEM item or an after-market accessory. In some cases, these luggage racks are permanently affixed in a generally horizontal position extending from the saddle or seat rearwardly over the rear fender or wheel. Many riders object to the appearance of a permanently affixed luggage rack of this type.

Convertible backrest seat combinations attached to the frame of motorcycles have also been proposed. For example, U.S. Pat. No. 3,901,534 shows a backrest luggage rack for motorcycles having a frame which is pivotally connected to a bracket so that it may be converted from a vertical backrest to a horizontal luggage rack. Devices of this type rely on ratchet mechanisms to maintain the rack in the desired position. One objection is that in the backrest position, the ratchet mechanism can accidentally release due to the weight of the rider. Further, in the horizontal or luggage rack position, the rider is left without the comfort and safety of a backrest.

Accordingly, there exists a need for a luggage rack for motorcycles which may be quickly and easily installed and may be pivoted between an out-of-the-way position which does not aesthetically detract from the appearance of the motorcycle and which can be easily pivoted to a horizontal use position in which luggage and gear may be secured to the rack.

BRIEF SUMMARY OF THE INVENTION

Briefly, the present invention provides a fold-down luggage rack particularly for a motorcycle having an existing backrest, sometimes termed a "sissy" bar. The rack may be an OEM item or retrofit to existing motorcycles. The fold-down luggage rack of the present invention has a frame which conforms to the shape of the sissy bar. The lower ends of the legs of the frame are undercut forming an end section with a bore. The end section is pivotally received within a mounting bracket. The mounting bracket carries a flange with spaced-apart bores which align with the mounting plates inside the existing sissy bar brackets. The luggage rack mounting bracket has a pair of spaced-apart flanges which receive the lower ends of the frame legs. The outer flange of each bracket is relatively thin having some flexibility and the opposite inner flange is tapped so that a fastener, such as a cap screw, may be inserted through the thinner outer flange, through the bore in the lower end of the associated leg of the luggage rack and into the threaded inner flange. Both of the opposed lower ends of the legs of the frame are mounted in this manner. The cap screw can be tightened against the outer flange to provide the desired frictional resistance to the pivoting of the frame. In the out-of-the-way or stored position, the luggage rack abuts the existing back support. No additional hardware is required to mount the luggage rack. To place the luggage rack in use, the frame is pivoted to a horizontal use position. The surface of the frame and the bracket provide a stop.

In another embodiment of the present invention, the rack has mounting brackets, each with a stop surface, which abut the associated leg of the frame when in the horizontal, use position. Magnets may be inserted in the rack to assist in maintaining it in the up, stored position.

BRIEF DESCRIPTION OF THE DRAWINGS

The above and other advantages and features of the present invention will be more fully understood from the following description, claims and drawings in which:

DETAILED DESCRIPTION OF THE DRAWINGS

Figure 1:
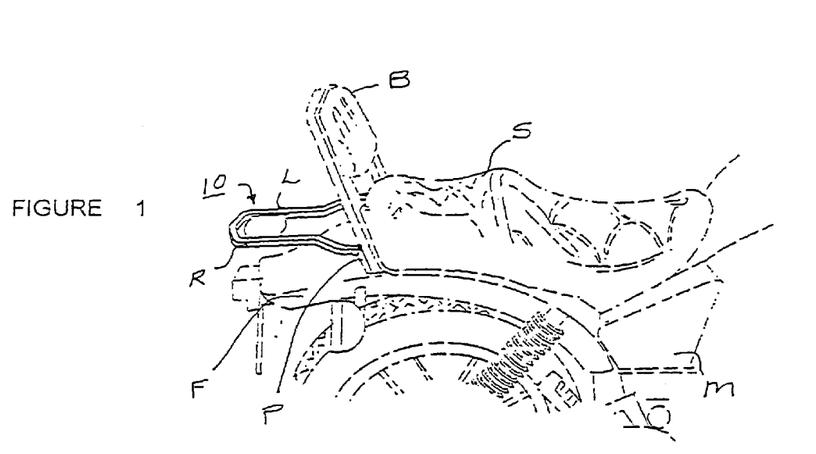
FIG. 1 is a perspective view of a rear of a motorcycle showing an embodiment of the luggage of the present invention attached thereto and positioned in a generally horizontal use position.

Turning now to the drawings, the luggage rack of the present invention is generally designated by the numeral 10 and is intended for use with motorcycles of the type shown in FIG. 1, generally designated by the letter M. Motorcycles of this type typically have a seat S and a rear fender F. A backrest B, sometimes termed a "sissy bar," is secured to the rear fender of a motorcycle at mounting plates P on either side of the fender and held by screws. The terms "right" and "left," as used, refer to the rider's left and right when seated on seat S.

Figure 4:
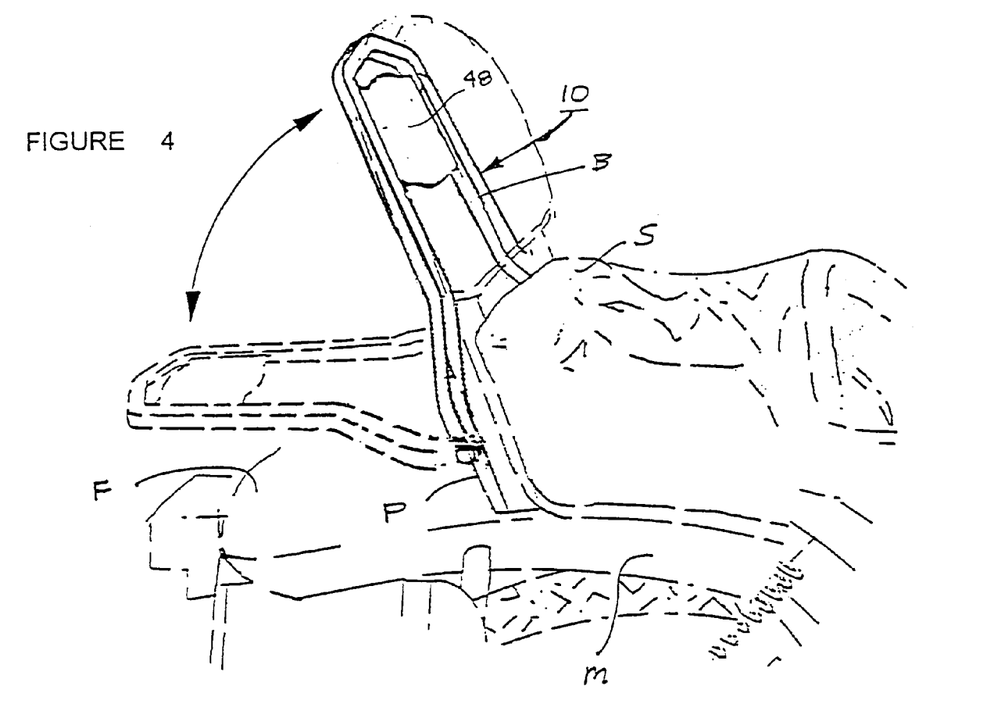
FIG. 4 is a perspective view of a rear of a motorcycle showing the rack in the up or stored position and also showing the rack in the use position in dotted lines and the existing sissy bar in dotted lines.

As best seen in FIG. 4, the existing prior art "Sissy Bar" or back rest B has a generally U-shaped upper section which diverges outwardly at its lower end to the mounting locations. An insert plate may extend between the side of the sissy bar frame and reinforces the frame and often may carry emblems such as a manufacturer's logo.

Figure 2:
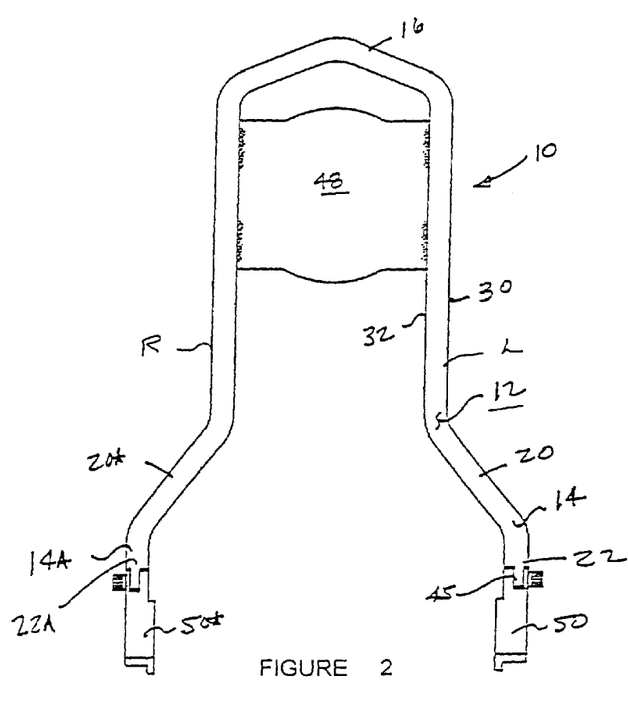
FIG. 2 is a front view of the luggage rack of the present invention.
Figure 3:
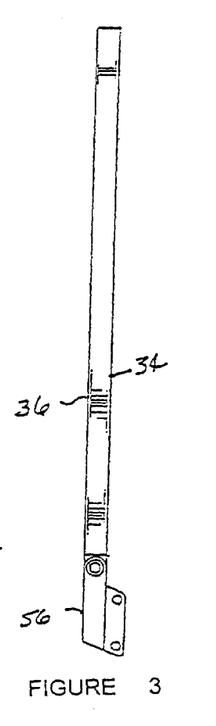
FIG. 3 is right side view of the rack, the left side being a mirror image thereof.
Figure 5:
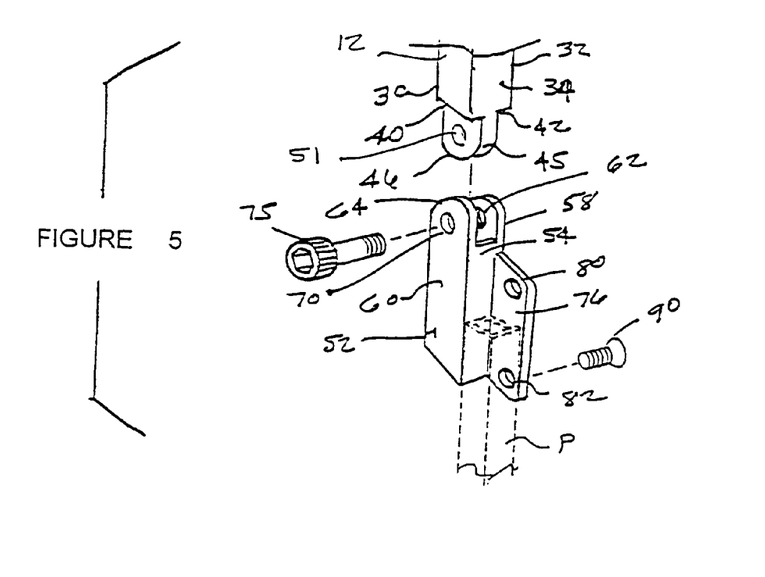
FIG. 5 is a detail view of the end of the left frame leg and the associated mounting bracket with the right side being the mirror image thereof.

The luggage rack 10 of the present invention is shown in FIGS. 2 and 3 and has a frame 12 which includes a pair of spaced-apart legs 14, 14A which are joined at their upper end at generally U-shaped section 16. Leg 14 is the left side leg. The lower end of the legs diverge outwardly at 20 and 20A terminating at end sections 22 and 22A which are parallel to one another. The frame may be fabricated from any suitable material but preferably are fabricated from square or rectangular steel tubing or solid cold rolled bar stock having an outer sidewall 30, inner sidewall 32, front wall 34 and rear wall 36. As best seen in FIGS. 2 and 5, the outer wall 30 and the inner wall 32 are undercut at 40 and 42. The depth of the undercut 40 in the outer wall 30 is substantially less than the depth of the undercut 42 in the inner wall 32. The undercuts define a pivotal end section 45 having a rounded distal end 46 and a bore 51.

A plate 48 extends between the side rails of the frame near the upper end. The overall configuration of the frame and that of the plate 48 are selected to match or closely conform to the shape of the existing back support or sissy bar B. Thus, depending upon the particular make and model of motorcycle, the shape of the luggage rack frame 12 may vary. The particular frame configuration shown is intended to be compatible with sissy bars of the type conventionally used on motorcycles such as those manufactured by Harley Davidson.

A pair of mounting brackets 50 and 50A secure the luggage rack to the motorcycle. The mounting brackets 50 and 50A are similarly constructed, however it will be appreciated that bracket 50 is adapted to attach the left side 14 of the frame of the motorcycle seen in the FIG. 2 and bracket 50A is attached to the lower end of the frame member 14A to the motorcycle. However, it is believed that the description of the mounting bracket 50A is sufficient, it being understood that the bracket 50 is a mirror image of bracket 50A.

Referring to FIGS. 2 and 5, the mounting bracket 50A consists of an elongate body 52 having a generally rectangular configuration with a front surface 54, rear surface 56 and opposite inner sidewall 58 and outer sidewall 60. A slot 62 is provided in the upper end of the body and is sized to receive the lower pivotal end 45 of the frame 14A. The upper ends of the sidewalls 58, 60, which define the slot 62, are slightly rounded at their upper ends at 64 as shown. It is noted that the slot 62 is not centered in body 52 but is offset so that the outer wall portion 60 adjacent the slot is substantially thinner than the inner wall portion 58. A transverse bore 70 extends through the inner and outer wall portions so that the lower end 45 of the frame 14A may be inserted into the slot. The bore 62 in the inner wall 58 is threaded so as to receive a fastener such as a cap screw 75.

A flange 76 projects from the front wall of the body 52 having an outer surface which is generally planar with the inner wall 58 of the body. The flange defines a pair of vertically spaced-apart bores 80, 82 which are chamfered and are positioned to align with bores in the existing back support mounting plate components P as will be explained. The use and advantages of the fold-down luggage rack will be better understood from the following description of installation.

The first step in installing the luggage rack is to remove the OEM sissy bar B and mounting plates P from opposite sides of the fender. This is done in order to prevent any damage to the fender during the installation process. Once the sissy bar B and existing mounting plates P are removed, installer will then remove the screws holding the sissy bar onto the mounting plates. These screws 90 will be then used to secure the luggage rack mounting brackets 50, 50A to the sissy bar plates P, as best seen in FIG. 5. The screws will extend from the inner surface of the mounting flange 76 into the sissy bar mounting plate P and, once tightened, will be recessed, fitting snugly into the chamfer of the bores 80, 82. Note that the brackets are mounted with the thin wall disposed outwardly as best seen in FIG. 2.

Figure 6:
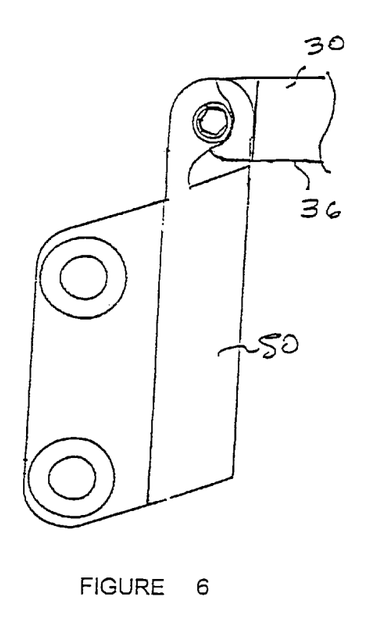
FIG. 6 is a detail view of the lower end of the left side of the frame and the mounting bracket shown in a horizontal, or use position, partly broken away to better illustrate the cooperation of the components.
Figure 6A:
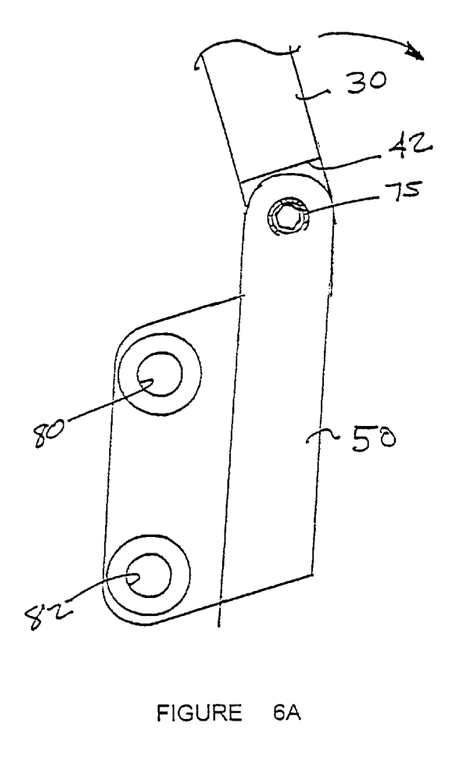
FIG. 6A is a view similar to FIG. 6 with the luggage rack shown in the stored position.

The next step is to reinstall the sissy bar and mounting plates to the fender with the attached luggage brackets disposed on either side of the fender. The luggage rack 10 can now be installed by inserting the lower ends of the frame legs 14, 14A into the slots 62 at the upper end of the mounting brackets 50, 50A. Cap screws are inserted from the outer surface of the brackets 50, 50A through the lower end of the frames 14, 14A and placed in threaded engagement with the threaded bore at the upper end of the bracket. The cap screws can be tightened to apply the desired force to achieve proper friction fit. It will be noted that the thinner, outer wall of the mounting bracket will allow some deflection so that the frictional fit can be adjusted. Once installed and adjusted, the luggage rack 10 is ready for use. In the use position, it may be manually folded down to a horizontal position as shown in FIG. 4. The rear surfaces 36 of the legs will engage the brackets as seen in FIG. 6 to maintain the rack in a horizontal use position. When not in use, the rack can be folded upwardly to a stored position abutting and matching the existing back support.

Figure 7:
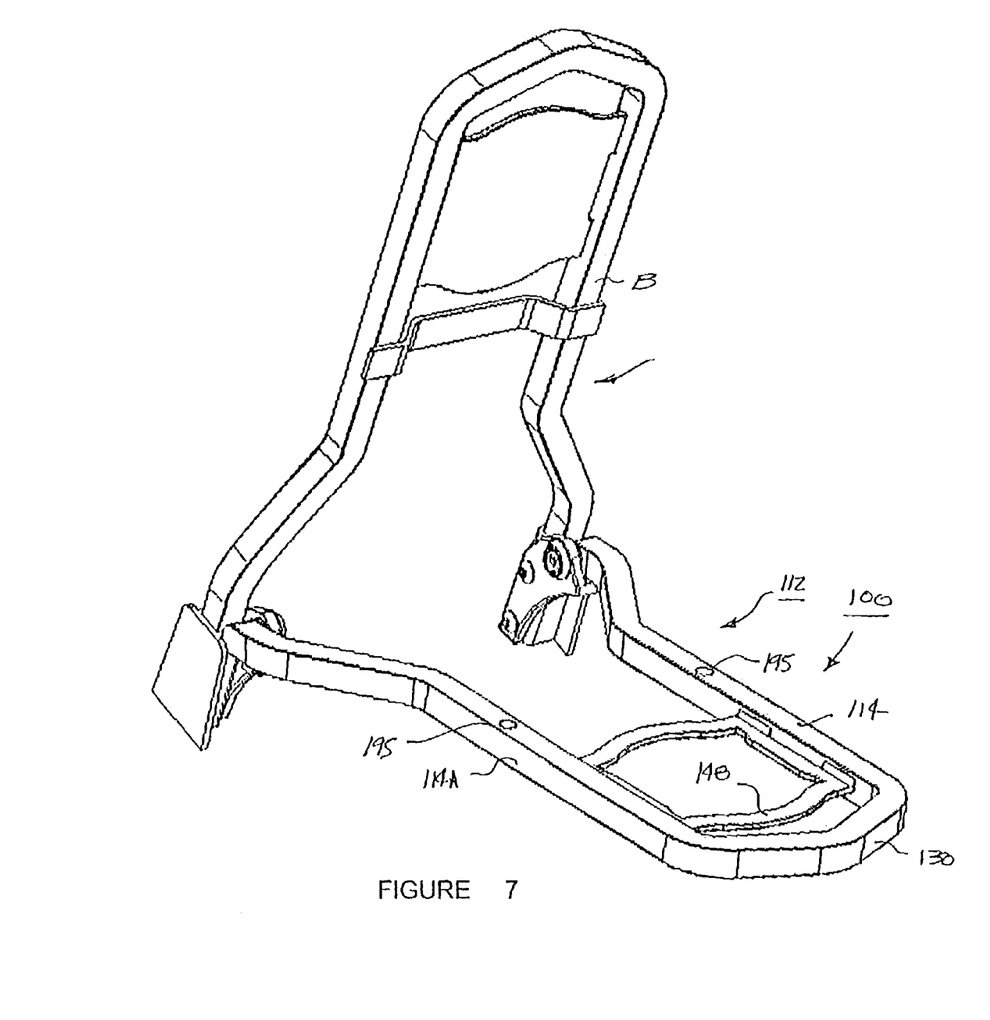
FIG. 7 is a rear perspective view of an alternate embodiment of the rack of the present invention.
Figure 8:
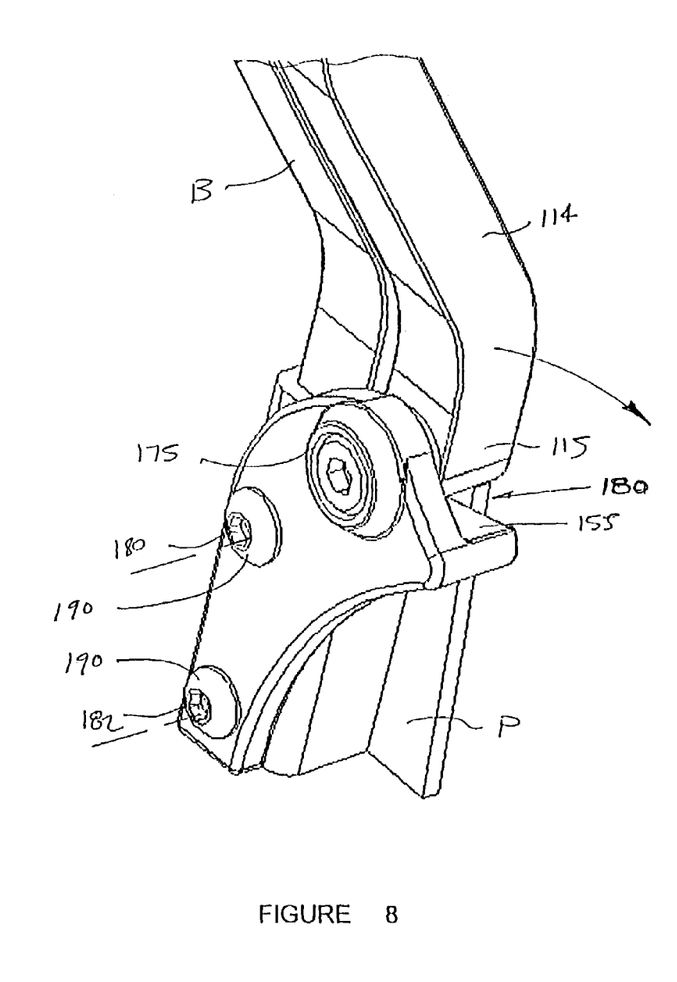
FIG. 8 is a detail view of the alternate embodiment of the rack of FIG. 7 showing the lower end of one frame leg and a bracket.
Figure 9:
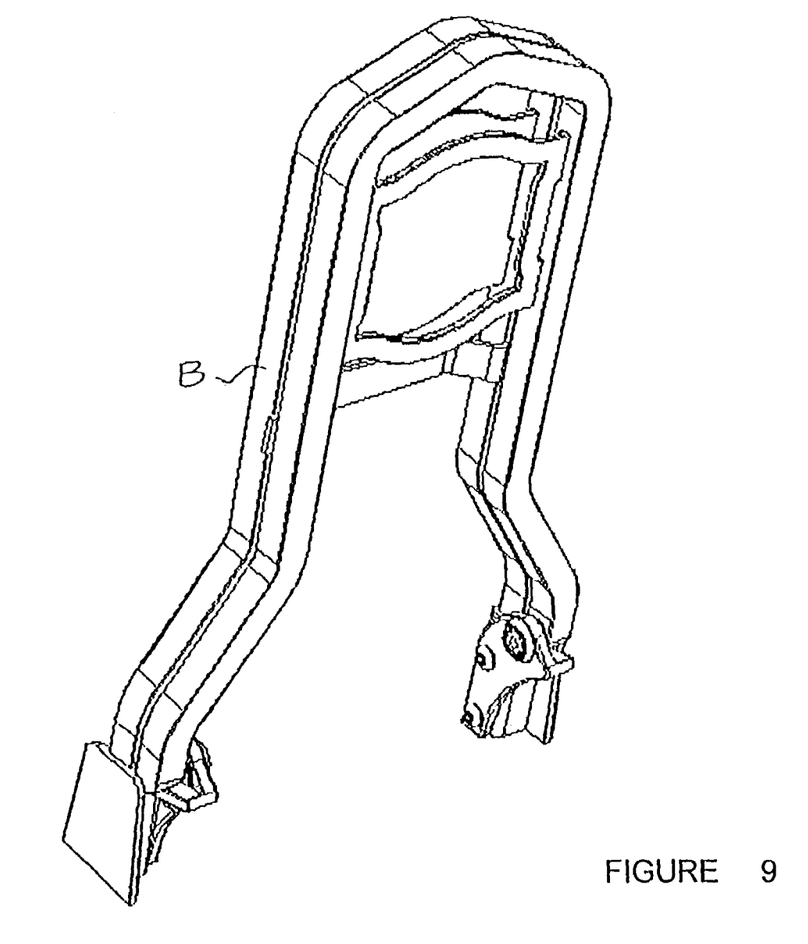
FIG. 9 is a perspective view of the rack of FIG. 7 in an up or stored position.

FIGS. 7 to 9 illustrate another embodiment of the luggage rack generally identified by the numeral 100 and in FIGS. 7 and 9 is shown with the existing sissy bar B. The rack 100 has a frame 112 with legs 114 and 114A attached at their upper ends at 130. A plate or frame 148 extends between the legs for reinforcement and to provide a convenient location for attachment of an emblem or insignia. The lower ends of the frame legs terminate at end sections which are bored at 151.

Figure 8A:
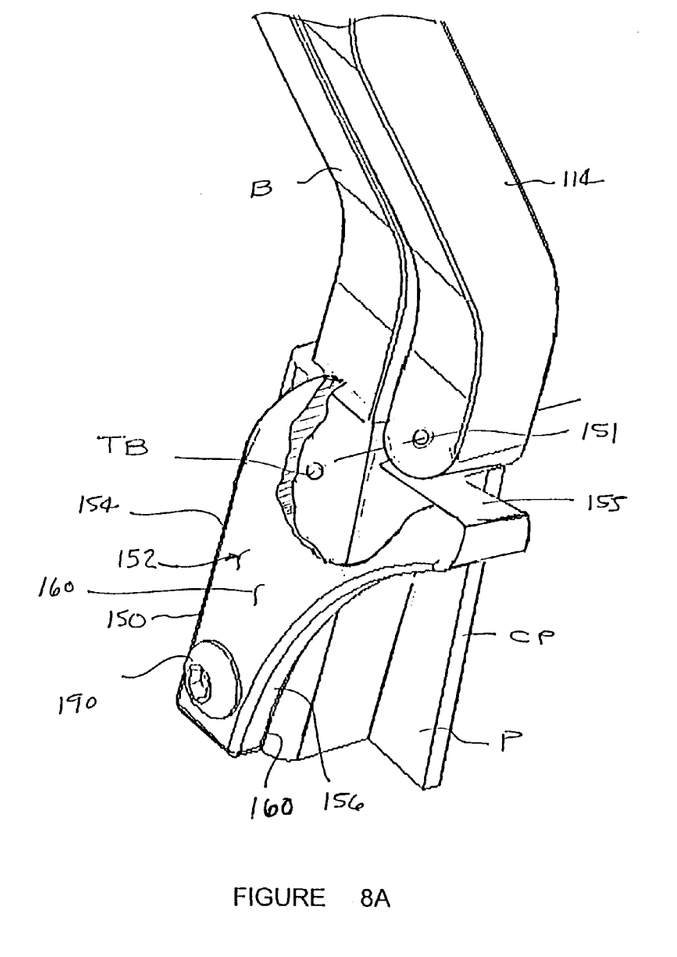
FIG. 8A is a view similar to FIG. 8 broken away to better illustrate the constructional details.

The bracket 150, 150A is attached at either side fo the rear of the motorcycle to the existing mounting plates provided by the manufacturer. The outer surface of the plates P provided by the manufacturer. Plates P have a cover plate CP and in this embodiment the plates P receive the existing sissy bar B and have two spaced-apart threaded bores TB, the upper being seen in FIG. 8A. The existing fasteners 190 are removed so the bracket may be attached to the existing plates. FIG. 8 is a detail view of the lower end of frame leg 114 and bracket 150 which would, in the installed position, be on the rider's left side.

The brackets 150 and 150A are mirror images of one another so a description of bracket 150 is sufficient. The bracket 150 has a body 152 with a front 154, rear 156 and opposite sidewalls 158, 160. A ramp or shelf 155 projects rearwardly. A bore 162 in the upper end of wall 158 aligns with the bore 151 in the lower end of the frame leg 114. Bores 180 and 182 align with the existing bores TB in the mounting plate so the bracket is attached by fasteners 190 to the plate P. A fastener 175 extends through the threaded bore in the body and through the bore in the leg to pivotally secure the leg 114. The fastener is a socket head, cap screw and the frictional engagement between the bracket and the leg may be adjusted by tightening or loosening the fastener 175 with an appropriate tool.

In the up position, the frame abuts the existing sissy bar B as seen in FIG. 9. To lower the rack, the frame is manually pivoted downwardly until surface 115 of the legs abuts the shelf 155 stopping the rack in a horizontal position seen in FIG. 7. Note, an undercut clearance space 180 exits between the lower ends of the legs, as shown on leg 114 in FIG. 7 and the shelf 155 when the rack is in the up or stored position.

To assist in maintaining the rack in an up position, small magnets 195 may be inserted into a surface of the frame legs 114, 114A at intermediate locations to abut the sissy bar B when the frame is up, as seen in FIG. 7. Magnetic attraction will prevent inadvertent lowering of the rack particularly if the bike is driven over rough, bumpy terrain or roads.

From the foregoing, it will be appreciated that no additional hardware is required to install the unit and that it is aesthetically pleasing, conforming to the existing motorcycle seat rest.

It will be obvious to those skilled in the art to make various changes, alterations and modifications to the invention described herein. To the extent these various changes, alterations and modifications do not depart from the spirit and scope of the appended claims, they are intended to be encompassed therein.

We claim:

1. A luggage rack for pivotal attachment to a motorcycle having a rear fender and a sissy bar mounted at sissy bar mounting plates disposed on opposite sides of the rear fender and having bores therein, said rack comprising:
    (a) a frame having a generally U-shape with opposite legs each terminating at lower pivot ends defining a bore, said frame having a configuration conforming to that of the sissy bar and wherein said rack abuts the sissy bar in an upright stored position;
    (b) a pair of mounting brackets each having a body with a flange, said flange having bores adapted to align with the bores in the mounting plates at opposite sides of the motorcycle;
    (c) each said body defining a location for receiving the lower pivot end of the associated leg, said location defining a bore aligned with the bore in the associated leg;
    (d) a fastener associated with each bracket extending through said bracket and the associated leg whereby said fastener may be selectively tightened to provide a frictional fit between the bracket and frame to allow the user to manually pivot the frame between a generally horizontal use position and a generally vertical stored position; and
    (e) a stop on said bracket to engage said frame when the frame is in a generally horizontal position.

2. The luggage rack of claim 1 wherein said frame is chrome plated steel.

3. The luggage rack of claim 1 wherein a plate extends between the opposite legs of the frame.

4. The luggage rack of claim 3 wherein said plate carries indicia.

5. The luggage rack of claim 1 wherein said frame including retaining means to retain said rack in said stored position.

6. A luggage rack for pivotal attachment to a motorcycle having a rear fender and a sissy bar at sissy bar mounted at sissy bar mounting plates disposed on opposite sides of the rear fender and having bores therein, said rack comprising:
    (a) a frame having a generally U-shape with opposite legs each terminating at lower pivot ends defining a bore, said frame having a configuration conforming to that of the sissy bar and wherein said rack abuts the sissy bar in an upright stored position;
    (b) a pair of mounting brackets each having a body with a flange, said flange having bores adapted to align with the bores in the mounting plates at opposite sides of the motorcycle;
    (c) said bracket body defining a slot for receiving the lower end of the associated leg, said slot being defined by sidewalls, one of which being deflectable to apply a frictional force to said frame;
    (d) a fastener associated with each bracket extending through said bracket and the associated leg whereby said fastener may be selectively tightened to provide a frictional fit between the bracket and frame to allow the user to manually pivot the frame between a generally horizontal use position and a generally vertical stored position; and
    (e) a stop on said bracket to engage said frame when the frame is in a generally horizontal position.

* * * * *